United States Patent [19]

Snyder

[11] 4,004,707

[45] Jan. 25, 1977

[54] FLUID BAFFLE IN MASTER CYLINDER RESERVOIR

[75] Inventor: George E. Snyder, Phillipsburg, Ohio

[73] Assignee: General Motors Corporation, Detroit, Mich.

[22] Filed: Apr. 5, 1976

[21] Appl. No.: 673,709

[52] U.S. Cl. .............................. 220/22; 188/345; 220/85 B

[51] Int. Cl.² .................. B65D 1/24; B65D 25/00; B60T 11/00

[58] Field of Search ............... 220/22, 22.1, 22.2, 220/22.3, 85 B; 188/345

[56] References Cited

UNITED STATES PATENTS

| | | | |
|---|---|---|---|
| 2,034,030 | 3/1936 | Gaugler | 220/22 X |
| 3,173,265 | 3/1965 | Bixby | 220/85 B X |
| 3,701,257 | 10/1972 | Gaiser | 188/345 X |

Primary Examiner—William Price
Assistant Examiner—Steven M. Pollard
Attorney, Agent, or Firm—D. D. McGraw

[57] ABSTRACT

A master cylinder has a sheet metal reservoir divided into reservoir chamber sections by a molded nylon baffle inserted in the reservoir and held in place due to an interference fit across the width of the reservoir. The baffle has a portion providing a spring-like action which maintains a continuous force tending to hold the baffle in place. The baffle is constructed as a plate with pad sections engaging the reservoir side walls, the plate being separated into sections by a generally cylindrical compression ring which provides the desired resiliency. The edge of the baffle engaging the reservoir bottom is shaped to fit the contour of the bottom. At least a part of this edge is feathered or tapered to allow it to more readily conform to the bottom.

2 Claims, 4 Drawing Figures

U.S. Patent
Jan. 25, 1977
4,004,707
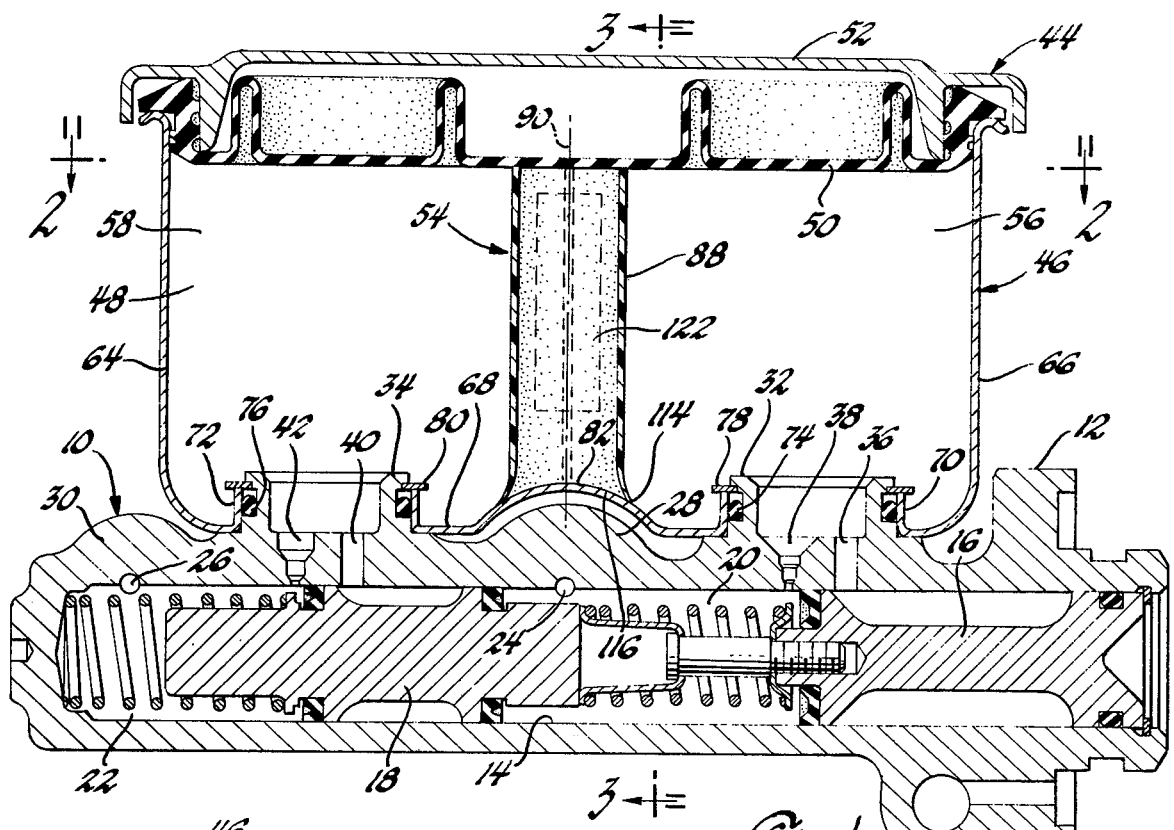
Fig.1
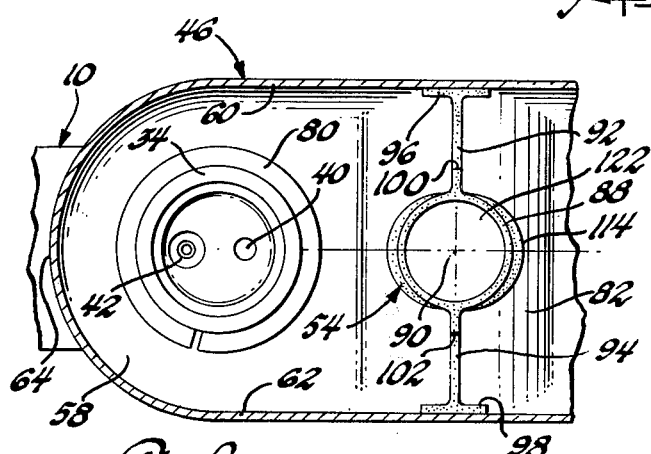
Fig.2
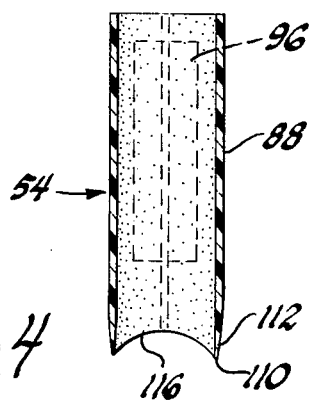
Fig.4
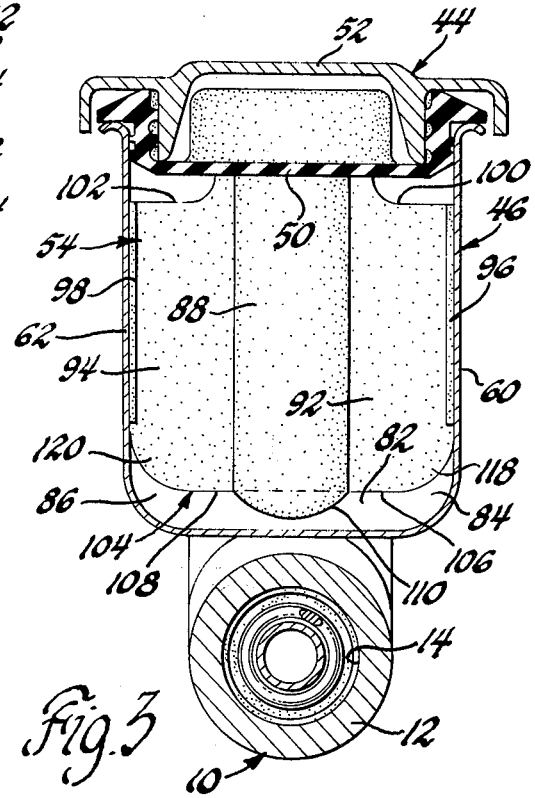
Fig.3
Fig.5

FLUID BAFFLE IN MASTER CYLINDER RESERVOIR

The invention relates to a removable and replaceable baffle for a fluid reservoir, and more particularly to such a baffle as installed in a master cylinder stamped steel reservoir chamber. In recent years vehicles have been provided with multiple circuit fluid brake systems. The master cylinder reservoirs for the brake fluid are divided into sections to limit or prevent fluid loss from one section when the brake subsystem for the other section has been damaged so as to lose fluid. It has been common practice to provide a master cylinder body as a unitary casting, including the reservoir and appropriate baffle arrangements. Some reservoirs have been made of a suitable plastic and attached to the main master cylinder body. Baffles are readily molded integrally in such reservoirs.

With the development of stamped steel reservoirs, it became apparent that the baffles could not be easily formed in the stamping process as a part of the reservoir housing. Such reservoirs therefore required a baffle arrangement which is effective and economically feasible. Baffle plates made of suitable metal have been used, the plates usually being welded, brazed or soldered in place. Such a construction is time consuming, requires close tolerances, and results in a relatively expensive reservoir construction compared to the earlier arrangements discussed above.

By using a resilient plastic baffle which is readily inserted and removed, and which will conform to variations in the reservoir walls and particularly the reservoir bottom, tolerance problems have been eliminated. By using an interference fit and relying upon the resiliency of the baffle, the problem of fastening the baffle to the reservoir housing has likewise been eliminated.

The baffle embodying the invention includes an arrangement to provide resilient loading between the reservoir housing side walls so that the baffle is retained in position. The baffle is provided with a resilient section which permits easy installation while exerting the necessary force to hold the baffle in place. The baffle is also constructed at the lower edge sections to assure conforming engagement with the reservoir bottom.

In some master cylinder constructions, the reservoir bottom has a ridge running across the bottom at about the point where the baffle is installed. This ridge is provided to clear an outlet passage boss for one of the master cylinder pressurizing chambers. The ridge is therefore utilized to assist in fore and aft location and retention of the baffle, and at least a portion of the bottom edge of the baffle is tapered to a feathered edge so that it may readily flex during installation to obtain the desired conforming engagement. In making the ridge as part of the stamped reservoir, the ends of the ridge as they approach the housing side walls may be curved upwardly and the baffle may be formed in mating relation. This arrangement also assists in baffle installation since the curved corners of the baffle will act as a lead-in.

IN THE DRAWINGS

FIG. 1 is a cross-section view of a master cylinder assembly embodying the invention.

FIG. 2 is a fragmentary plan section view of the assembly of FIG. 1 taken in the direction of arrows 2—2 of that Figure.

FIG. 3 is a cross-section view of the assembly of FIG. 1 taken in the direction of arrows 3—3 of that Figure.

FIG. 4 is a cross-section view of the baffle used in FIG. 1 prior to installation and particularly illustrating the provision of a tapered edge at the lower portion of the baffle.

The master cylinder assembly 10 has a body 12 in which a bore 14 is formed to receive the primary piston assembly 16 and the secondary piston assembly 18. These piston assemblies and the body 12 define the primary pressurizing chamber 20 and the secondary pressurizing chamber 22. Outlets 24 and 26 are respectively provided for the pressurizing chambers. As illustrated, these outlets are respectively associated with bosses 28 and 30, which provide for connection of hydraulic brake lines to the master cylinder body. The body 12 also includes bosses 32 and 34, which extend upwardly and are axially spaced. These bosses provide entrys for the primary section compensation ports 36 and 38 and the secondary section compensation ports 40 and 42. The bosses also provide a mounting arrangement for the fluid reservoir assembly 44.

The reservoir assembly 44 includes a housing 46 defining a fluid reservoir chamber 48, a diaphragm seal 50, and a reservoir chamber cover 52. The baffle 54 embodying the invention is so positioned in chamber 48 as to divide that chamber into a primary reservoir section 56 and a secondary reservoir section 58. Boss 32, with its compensation ports 36 and 38, opens into primary reservoir section 56. Boss 34, with its compensation ports 40 and 42, opens into secondary reservoir section 58.

The reservoir housing 46 has side walls 60 and 62 joined at opposite ends by end walls 64 and 66. It also has a bottom 68 provided with annular flanges 70 and 72. These flanges fit about bosses 32 and 34, the bosses being respectively provided with seals 74 and 76 to prevent fluid leakage. Suitable fastening devices such as snap rings 78 and 80 may be installed so that they engage the bosses 32 and 34 as well as the flanges 70 and 72 to hold the reservoir assembly 44 in position on the master cylinder body 12. The reservoir bottom 68 has a transverse ridge 82 positioned between flanges 70 and 72 and so arranged that it clears outlet boss 28. The portions 84 and 86 of the ridge at either end are preferably faired into the side walls 60 and 62.

Baffle 54 has a generally cylindrical central section 88, its axis 90 extending upwardly and substantially parallel to the housing end and side walls. Section 88 is radially resilient, being subject to radial compression during baffle installation. The baffle also includes plate sections 92 and 94 which extend in radially opposite directions outwardly from section 88 and in a plane substantially perpendicular to the reservoir housing side walls 60 and 62. The plane also passes through axis 90 of the center section 88. The plate sections and the center section have lower edges defining a baffle lower edge which engages the bottom of the reservoir housing when the baffle is installed. The baffle also includes pad sections 96 and 98 respectively positioned on the opposite sides of the plate sections 92 and 94 and extending transversely of the plate sections so that, when installed, they are parallel to and engage the respective side walls 60 and 62.

As seen in FIG. 3, the top portions of the plate sections 92 and 94 and the pad sections 96 and 98 may be cut away as shown at 100 and 102 to provide communication with the tops of the reservoir sections 56 and 58 immediately underneath diaphragm seal 50. The diaphragm seal 50 may rest on the top of the central reservoir portion 88 and so much of the plate sections as is not cut away.

It is particularly desirable to have conforming engagement of the baffle lower edge 104 with the reservoir housing bottom 68 in order to minimize fluid communication along the housing bottom between reservoir sections 56 and 58. This may be accomplished by providing a tapered or feathered edge along portions of the baffle lower edge 104. In the particular baffle illustrated, the baffle lower edge 104 is defined by lower edge 106 of plate section 92, lower edge 108 of plate section 94, and the lower edge 110 of the central section 88. Since the baffle is arranged to fit generally along the top of ridge 82, the plate lower edge 106 and 108 may be flat. It is desirable to provide a taper 112 in forming the central section edge 110, as better seen in FIG. 4, to increase the flexibility of that portion of central section 88 and to assure conforming engagement of that edge with ridge 82, as illustrated at 114. As also seen in FIG. 4 in cross-section view, the bottom of central section 88 is curved at 116 to substantially conform to the cross-section shape of ridge 82.

In its free condition, the baffle 54 has a planar width between the outer surfaces of pad sections 96 and 98 which is slightly greater than the width between the reservoir housing side walls 60 and 62. Upon installation an interference fit exists between the baffle and the two side walls. As the baffle is installed by forcing it downwardly in housing 46, the baffle curved lower corners 118 and 120 will provide a lead-in to the reservoir chamber. The generally cylindrical section 88 will be radially compressed in the plane of plate sections 92 and 94, thereby slightly expanding in a plane transverse to this plane, exerting a continuous retention force by engagement of the pad sections 96 and 98 with the inner surfaces of the side walls 60 and 62. As the baffle is fully inserted, the tapered edge 110 of the center section 88 will engage ridge 82 and then spread outwardly as shown in FIG. 1 to obtain conforming engagement at 114. This will also permit the plate edges 106 and 108 to bottom out against the top of ridge 82, effectively separating reservoir sections 56 and 58 below the level of cutouts 100 and 102.

It can be seen that the baffle does not require tolerances of the type that would be necessary if metal baffles of baffle sections were to be welded or otherwise fastened in place, and requires no fastening operation distinct from its installation. The baffle may be readily removed if needed, and is easily replaced. In instances where it is desired, the inner chamber 122 defined by central section 88 may have access apertures above the reservoir bottom 68 and a fluid level sensor float may be suspended therein to provide a level sensing section which is not subjected to temporary fluid level changes due to changes in road grade, deceleration and acceleration.

What is claimed is:

1. In a brake fluid reservoir housing having a bottom and oppositely disposed side walls defining a fluid reservoir chamber having separate reservoir sections, the improvement comprising:

a removable baffle within said housing extending between two of said oppositely disposed side walls to divide said chamber into said separate reservoir sections; said baffle being a unitary member composed of a radially resilient generally cylindrical section positioned intermediate said two side walls and in edge engagement with and extending upwardly from said reservoir bottom within said chamber, a pair of plate sections extending in radially opposite directions outwardly from said cylindrical section and in a plane substantially perpendicular to said two side walls and passing through the axis of said cylindrical section, and a pad section on each of said plate sections in spaced relation to said cylindrical section, said pad sections being parallel to and engaging said two side walls, the planar width of said baffle between said two side walls being such, in relation to the width of said chamber between said two side walls, that an interference fit exists between said baffle and said two side walls causing a resilient compressive deformation of said center section exerting forces on said two side walls and retaining said baffle in position in said chamber, at least a portion of said baffle in edge engagement with said reservoir bottom being flexibly tapered to provide a feather edge accommodating flexible conforming engagement with said reservoir bottom.

2. A fluid reservoir baffle adapted to be installed in a reservoir housing having spaced side walls and a bottom, said baffle comprising:

a unitary member having a cylindrically formed resilient center section providing a compression ring and having a flexible lower edge, radially oppositely extending plate sections attached axially of said center section, and reservoir side wall engageable pad sections attached to said plate sections opposite and generally parallel to the axis of said center section and substantially perpendicular to said plate sections, said baffle having a planar configuration matching a cross-sectional area of the reservoir housing in which the baffle is adapted to be installed, the cross-sectional area being defined by the inner surfaces of the housing spaced side walls and bottom;

said pad sections being spaced apart a distance greater than the distance between the reservoir housing spaced side walls so that upon installation of the baffle the resilient center section will be compressibly deformed radially where said plate sections are attached to exert a baffle retention force on the housing side walls, and said center section flexible lower edge being adapted to flexibly conform to the reservoir bottom.

* * * * *